(12) United States Patent
Sanchez, II et al.

(10) Patent No.: US 7,188,343 B2
(45) Date of Patent: Mar. 6, 2007

(54) DISTRIBUTABLE MULTI-DAEMON CONFIGURATION FOR MULTI-SYSTEM MANAGEMENT

(75) Inventors: Humberto A Sanchez, II, Ft. Collins, CO (US); Douglas P. Drees, Fort Collins, CO (US); Richard Dale Harrah, Seattle, WA (US); Mary Thomas Robb, Fort Collins, CO (US); Terence E. Lister, Fort Collins, CO (US); Michael Scheetz, Fort Collins, CO (US); Miha Wang, Cupertino, CA (US); Warren I Otsuka, Campbell, CA (US); Roger William Kumpf, Cupertino, CA (US); Jenny Yu, Saratoga, CA (US); Carol Ann Krug-Graves, Monte Sereno, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 479 days.

(21) Appl. No.: 09/859,374

(22) Filed: May 18, 2001

(65) Prior Publication Data
US 2002/0174259 A1 Nov. 21, 2002

(51) Int. Cl.
*G06F 9/46* (2006.01)
(52) U.S. Cl. ............ 718/100; 718/106; 709/205; 709/223
(58) Field of Classification Search ............ 709/105, 709/106, 202, 205, 248, 201, 223; 718/105, 718/106, 1, 100, 101
See application file for complete search history.

(56) References Cited

U.S. PATENT DOCUMENTS

| 5,971,851 | A * | 10/1999 | Pascal et al. ............... 463/24 |
| 6,275,941 | B1 * | 8/2001 | Saito et al. ............... 713/201 |
| 6,279,028 | B1 * | 8/2001 | Bradshaw et al. .......... 709/201 |
| 6,324,580 | B1 * | 11/2001 | Jindal et al. ............... 709/228 |
| 6,434,594 | B1 * | 8/2002 | Wesemann ............... 709/201 |
| 6,463,457 | B1 * | 10/2002 | Armentrout et al. ........ 709/201 |
| 6,529,515 | B1 * | 3/2003 | Raz et al. ............... 370/401 |
| 6,542,920 | B1 * | 4/2003 | Belkin et al. ............... 709/104 |
| 6,546,415 | B1 * | 4/2003 | Park ............... 709/202 |
| 6,622,157 | B1 * | 9/2003 | Heddaya et al. ............ 709/202 |
| 6,631,407 | B1 * | 10/2003 | Mukaiyama et al. ....... 709/223 |
| 6,662,205 | B1 * | 12/2003 | Bereiter ............... 709/201 |
| 6,697,845 | B1 * | 2/2004 | Andrews ............... 709/209 |
| 6,823,391 | B1 * | 11/2004 | Deen et al. ............... 709/229 |

* cited by examiner

*Primary Examiner*—William Thomson
*Assistant Examiner*—Andy Ho

(57) ABSTRACT

A system and method for managing multiple server computer systems on a computer network. The functions of a central management server are distributed to multiple daemons executing independently of each other on one or more computer systems. Distributing the functions of the central management server to separate multiple daemons substantially improves the reliability of a multi-server management application.

21 Claims, 10 Drawing Sheets

US 7,188,343 B2

DISTRIBUTABLE MULTI-DAEMON CONFIGURATION FOR MULTI-SYSTEM MANAGEMENT

TECHNICAL FIELD

This invention relates to computer system management, and more specifically to utilizing multiple distributable daemons to perform certain separable tasks of multiple system management.

BACKGROUND OF THE INVENTION

Administration of large, multi-server, computing environments is a field of growing interest as the number and size of large, multi-server computing environments grows. The field of multi-server system administration and management focuses on maintaining the physical operation of a multitude of computer systems, often referred to as nodes, connected in a network. This task includes a number of functions, including adding, modifying and removing nodes, users, tools, and roles; defining groups of nodes; authorizing users to perform operations on nodes; installing, maintaining and configuring hardware; installing and upgrading operating system and application software; and applying software patches, among other functions.

Several powerful software applications to assist and centralize the management of large, multi-server, computing environments have been developed in the field. Generally these applications have included a single, large multi-server management application running on a single centrally located management server operated by one or more system administrators. In only a few implementations have these applications included separate management agent applications running on each of the nodes in the multi-server computing environment.

With the rise of large Internet Service Providers ("ISPs") and Application Service Providers ("ASPs") the number of computer systems operating together in a network requiring administration and management has grown exponentially. As the size of the multi-server computing environment in which the single, large multi-server management applications running on single centrally located management servers grows, the more demands are made on the various functions of the multi-server management application, and the more likely is a failure of any one component of the multi-server management application and, thus, of the multi-server management application itself. In a very large multi-server computing environment such as that for an ISP or an ASP, a failure of the multi-server management application can be catastrophic. Ensuring the maximum availability of the functionality of the multi-server management application is of great concern to system administrators today. A large, single multi-server management application running on a single centrally located management server is thus an unacceptable single point of failure in a large multi-server computing environment.

SUMMARY OF INVENTION

In one respect, what is described is a system for managing multiple server computer systems on a computer network, wherein the functions of a central management server are distributed to multiple daemons executing independently of each other on one or more computer systems.

In another respect, what is described is a method for managing multiple server computer systems on a computer network, wherein the functions of a central management server are distributed to multiple daemons executing independently of each other on one or more computer systems.

In yet another respect, what is described is a computer readable medium on which is embedded a program. The embedded program includes instructions for executing the above method.

Those skilled in the art will appreciate these and other advantages and benefits of various embodiments of the invention upon reading the following detailed description of a preferred embodiment with reference to the below-listed drawings.

DETAILED DESCRIPTION OF A PREFERRED EMBODIMENT

Figure 1:
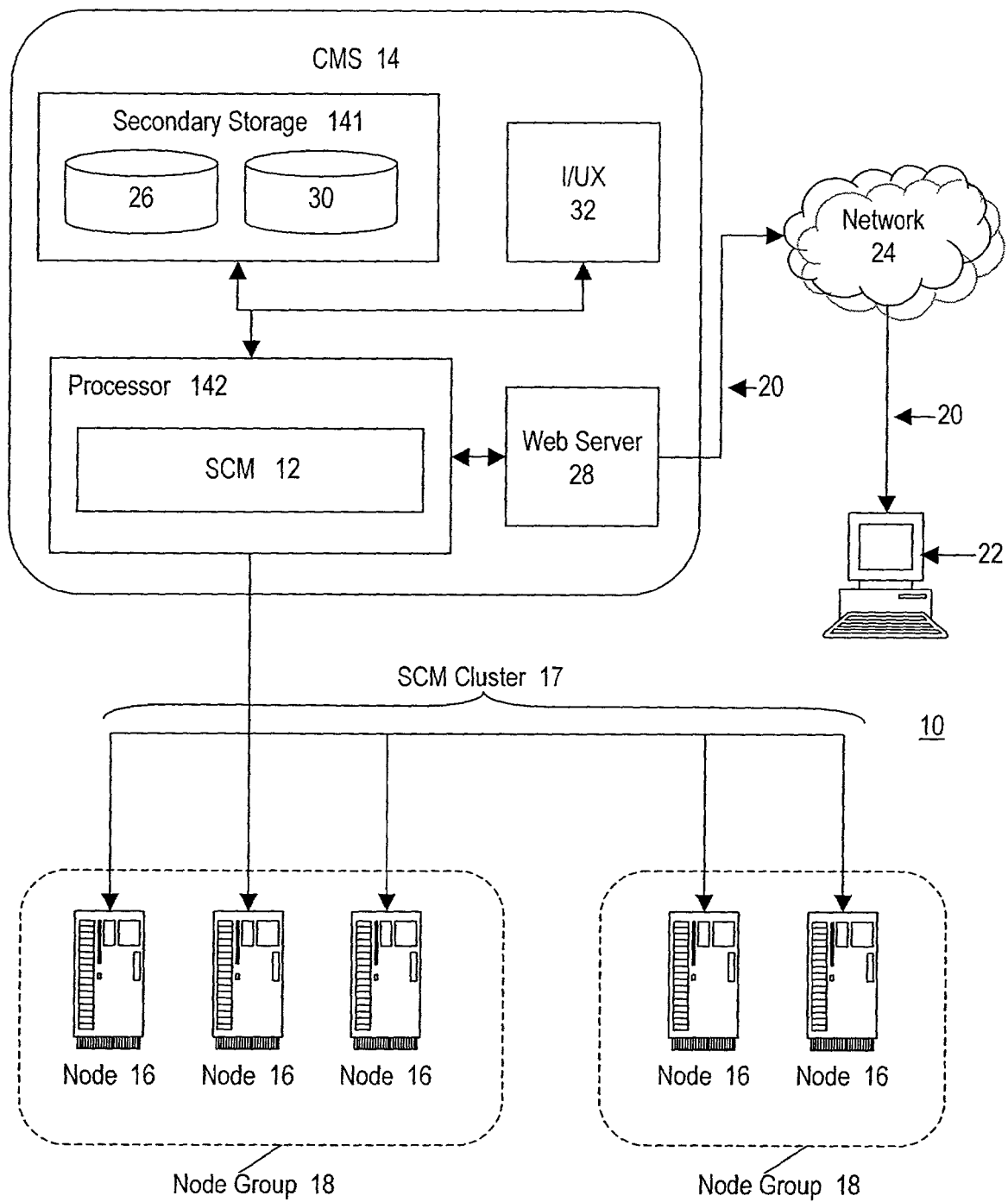
FIG. 1 is a block diagram of a network system on which the present invention may be run.

FIG. 1 shows a network system 10 on which the present invention may be run. The network system 10 comprises a Service control Manager ("SCM") 12 running on a Central Management Server ("CMS") 14 and one or more nodes 16 managed by the SCM 12 on the CMS 14. Together the one or more nodes 16 managed by the SCM 12 make up a SCM cluster 17. A group of nodes 16 may be organized as a node group 18. A node 16 preferably comprises a server or other computer system.

The CMS 14 preferably is an HP-UX 11.x server running the SCM 12 software. The CMS 14 includes a memory (not shown), a secondary storage device 141, a processor 142, an input device (not shown), a display device (not shown), and an output device (not shown). The memory, a computer readable medium, may include, RAM or similar types of memory, and it may store one or more applications for execution by processor 142, including the SCM 12 software. The secondary storage device 141, a computer readable medium, may include a hard disk drive, floppy disk drive, CD-ROM drive, or other types of non-volatile data storage.

The processor 142 executes the SCM 12 software and other application(s), which are stored in memory or secondary storage, or received from the Internet or other network 24. The SCM 12 is programmed in Java ® and operates in a Java ® environment. For more on the SCM 12, see Service Control Manager Technical Reference, HP part number: B8339-90019, which is hereby incorporated by reference.

Generally, the SCM 12 supports managing a single SCM cluster 17 from a single CMS 14. All tasks performed on the SCM cluster 17 are initiated on the CMS 14 either directly or remotely, for example, by reaching the CMS 14 via a web connection 20. Therefore, a workstation 22 at which a user sits only needs a web connection 20 over a network 24 to the CMS 14 in order to perform tasks on the SCM cluster 17. The workstation 22 preferably comprises a display, a memory, a processor, a secondary storage, an input device and an output device. In addition to the SCM 12 software and the HP-UX server described above, the CMS 14 preferably also comprises a data repository 26 for the SCM cluster 17, a web server 28 that allows web access to the SCM 12, a depot 30 comprising products used in the configuring of nodes, and an I/UX server 32. Java® objects operating in a Java® Virtual Machine ("JVM") provide the functionality of the SCM 12.

Object-oriented programming is a method of programming that pairs programming tasks and data into re-usable software components known as objects. Each object comprises attributes (i.e., data) that define and describe the object. Java classes are meta-definitions that define the structure of a Java object. Java classes when instantiated create instances of the Java classes and are then considered Java objects. Methods within Java objects are called to get or set attributes of the Java object and to change the state of the Java object. Associated with each method is code that is executed when the method is invoked.

Figure 2:
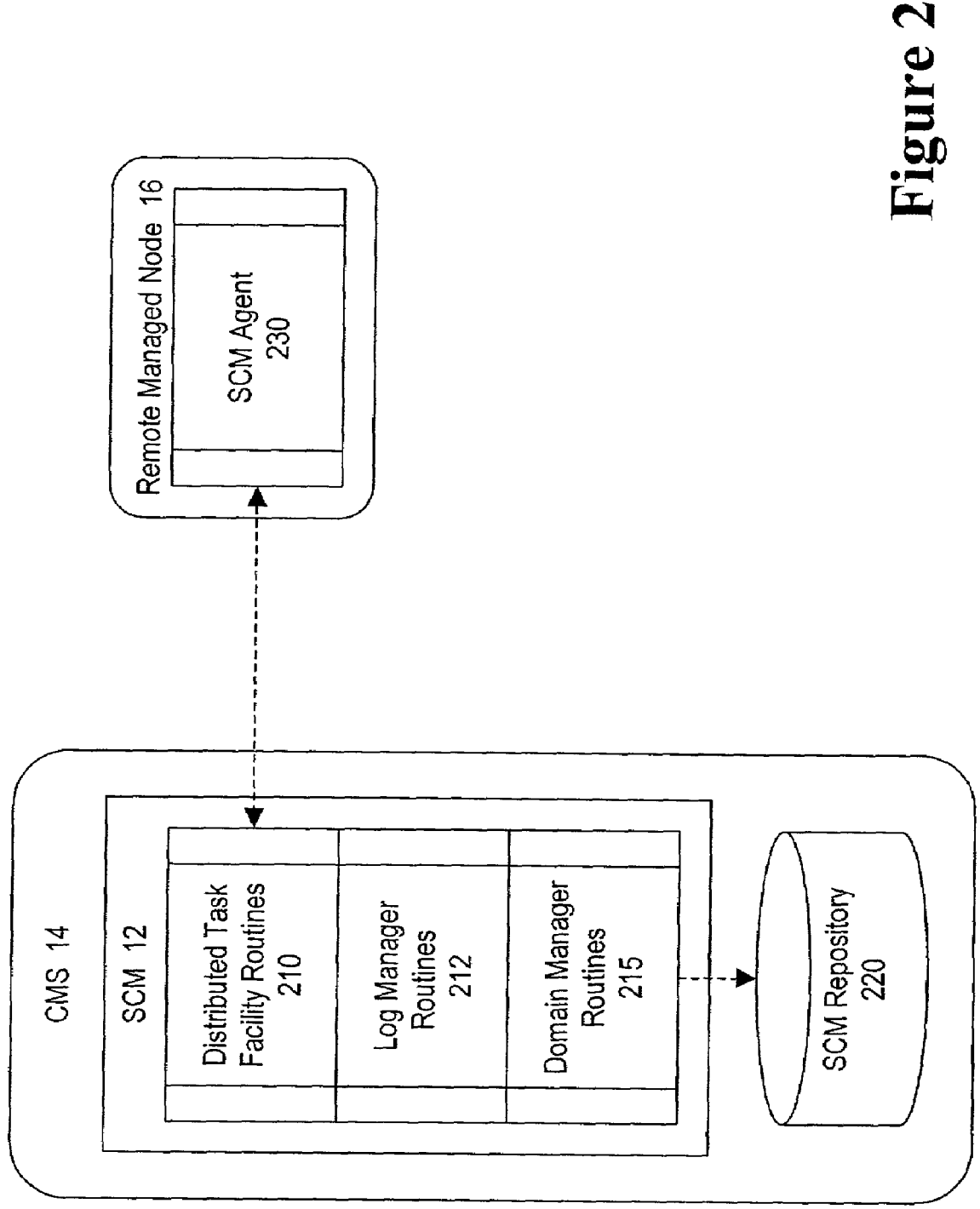
FIG. 2 is a block diagram of one embodiment of a multi-server management application running on a single computer system.

FIG. 2 shows the various modules within the SCM 12 running on a single CMS 14. This figure illustrates one embodiment of a multi-server management system where the functionality is contained in one combined application running on one computer system. The functionality of the SCM 12 may then be divided into separate sets of software routines with each routine performing a specific system management task or set of system management tasks. In the embodiment illustrated in FIG. 2, three sets of routines are shown: Distributed Task Facility routines 210, Log Manager routines 212, and Domain Manager routines 215. In addition, the CMS 14 includes a ServiceControl Manager Repository 220, preferably contained on the data repository 26 or depot 30.

The Log Manager routines 212 perform all the functions of the SCM 12 necessary to maintain a log of the system management actions taken by the SCM 12. This log serves as an audit trail permitting an accounting of each step of each task performed by the SCM 12 on any of the nodes 16, node groups 18, or the SCM cluster 17, as well as on the CMS 14 itself.

The Domain Manager routines 215 perform all of the functions of the SCM 12 relating to the management of users and user groups on the SCM cluster 17. The Domain Manager routines 215 manage the persistence of all SCM first-class objects. These include users, nodes, node groups, tools, roles, and authorizations. The Domain Manager routines 215 provide security by checking for proper user authorizations to execute commands on SCM clusters 17, node groups 18, and managed nodes 16, including node and node group authorizations. They also verify user authorizations to access the SCM Repository 220, e.g., to add users and nodes. The Domain manager routines 215 communicate with the Distributed Task Facility routines 210 and log results through the Log Manager routines 212.

The Distributed Task Facility ("DTF") routines 210 handle assignment and monitoring of tasks assigned to be performed on each of the remote nodes. The DTF routines 210 manage the connections to agents running on the managed nodes 16. They allow messages, files, and commands to be delivered to the agents running on the managed nodes 16. The DTF routines 210 initiate the tasks to be executed on the managed nodes 16 and monitor the results of those tasks, receiving information messages from the agents running on the managed nodes 16. On the CMS 14, the DTF routines 210 report the status of tasks and accept requests to initiate tasks on the managed nodes 16. The DTF routines 210 require no persistent objects. The DTF routines 210 communicate with the ServiceControl Manager Agent 230 running on the managed nodes 16 and log results through the Log Manager routines 212.

A ServiceControl Manager Agent ("SCM Agent") 230 is also shown running on a remote managed node 16. Each SCM Agent 230 accepts tasks for execution on the managed node 16 on which it is running, and accepts messages and requests from the DTF routines 210 to create files and execute commands on the managed node 16 on which the SCM Agent 230 is running. The SCM Agent 230 also transmits informational messages regarding the results of the tasks, commands and file creations requested by the DTF routines 210 back to the DTF routines 210.

Figure 3:
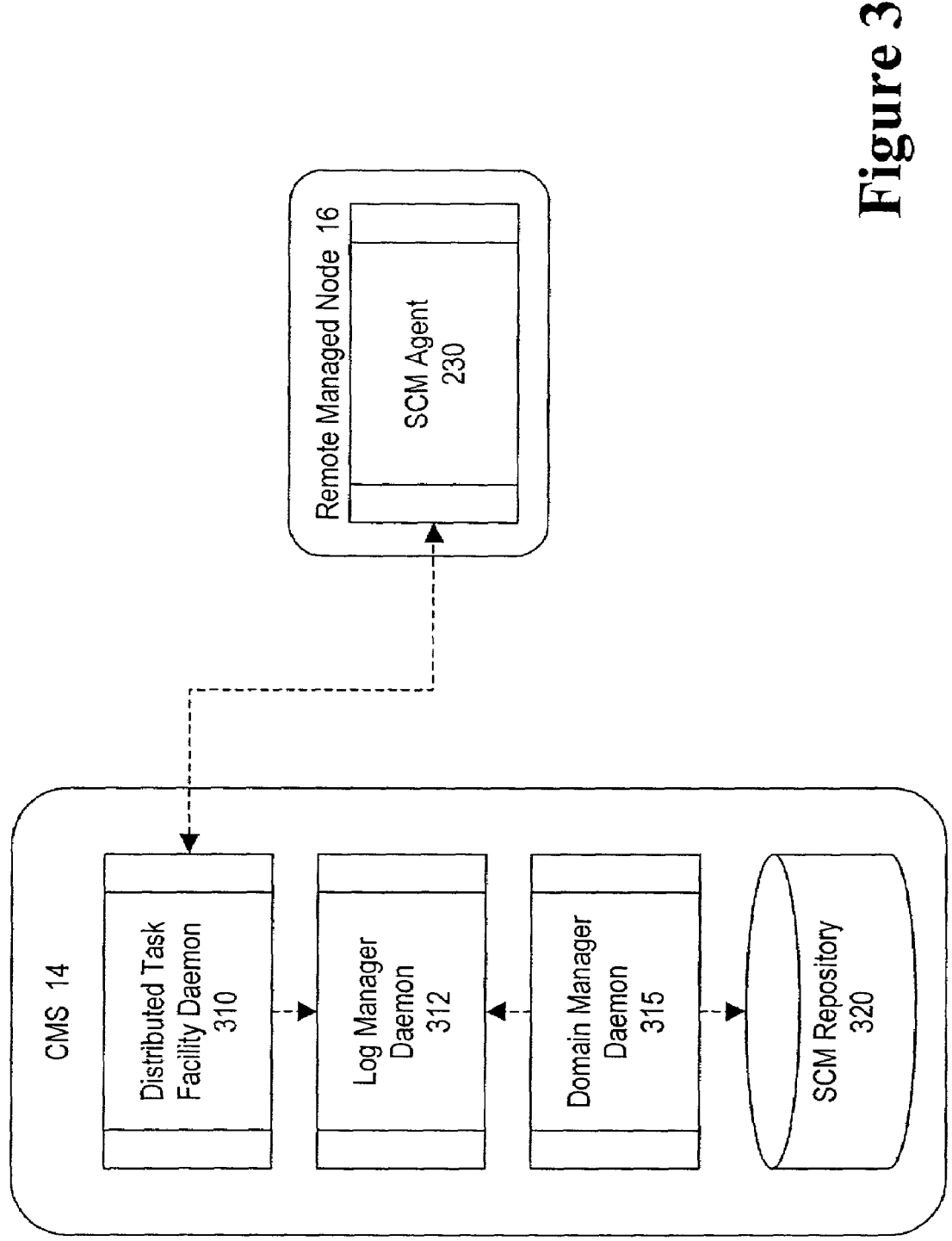
FIG. 3 is a block diagram of one embodiment of a system of multiple daemons of the present invention running on the single computer system.

FIG. 3 illustrates one embodiment of a multiple daemon system of the present invention running on a single computer system. In this embodiment, the functions of the SCM 12 are divided into a plurality of separate, independently executing processes, referred to in the terminology of UNIX systems as daemons. Each of the daemons performs specific, separable functions. FIG. 3 shows three such daemons, a Distributed Task Facility ("DTF") daemon 310, a Log Manager daemon 312, and a Domain Manager daemon 315, running on the CMS 14 system.

The Domain Manager daemon 315 takes on the functions of the Domain Manager routines 215 from FIG. 2 and is responsible for the security of the CMS 14, as well as for the persistence of all managed objects. The Log Manager daemon 312 takes on the functions of the Log Manager routines 212 from FIG. 2 and logs actions taken on the CMS 14 and on all managed nodes 16. Additionally, a remote method invocation ("RMI") daemon (not shown) may be implemented as a separately executing daemon in order to provide certain Java method invocation and interface services to the other daemons.

Also shown residing on the CMS 14 is a ServiceControl Manager ("SCM") Repository 320. The SCM Repository 320 stores the code and data provided by the users of the SCM 12 regarding users, nodes, node groups, roles, tools, and authorizations. The SCM Repository 320 stores node names that are in a SCM managed cluster 17, node names that are participating in specified node groups 18, and user names of selected UNIX system users that are participating in the use of the SCM 12. The SCM Repository 320 also maintains a list of which user names are SCM administrative users, role names, and their enablement status, their associated tool names, tool actions, and the associated roles, authorizations triplets for roles, users and nodes or node groups. The SCM Repository 320 thus maintains the code necessary to actually connect to a persistence model. It is connected only to the Domain Manager 315. None of the other daemons are permitted to connect directly to the SCM Repository 320. The other daemons must go through services provided by the Domain Manger daemon 315 to connect with the SCM Repository 320. A ServiceControl Manager Agent ("SCM Agent") 230 is also shown running as a daemon on a remote managed node 16, ready to receive and perform tasks assigned to it by the DTF daemon 310.

The Domain Manager daemon 315 communicates with the DTF daemon 310 and logs results through the Log Manager daemon 312. The DTF daemon 310 takes on the functions of the DTF routines 210 from FIG. 2, communicates with the ServiceControl Manager Agent 230 running on the managed nodes 16, and logs results through the Log Manager daemon 312.

By dividing the functions of the SCM 12 into separate daemons, the reliability of the management application is improved. Should the SCM 12 shown in FIGS. 1 and 2 fail for any reason, the entire range of functions performed by the SCM 12 are lost until the SCM 12 can be revived. In any large SCM cluster 17 this brings all systems management and systems administration operations to a halt. In the present invention, should the DTF daemon 310 fail, the Log Manager daemon 312 and Domain Manager daemon 315 may continue running and performing their respective systems management functions. Thus, while the functions of the DTF daemon 310 may be lost while it is down, those other SCM functions performed by the Log Manager daemon 312 and Domain Manager daemon 315 may continue to be performed largely unaffected. Furthermore, should either the Log Manager daemon 312 or Domain Manager daemon 315 fail, the functions of the remaining daemons, including the DTF daemon 310, would not be affected.

Figure 4:
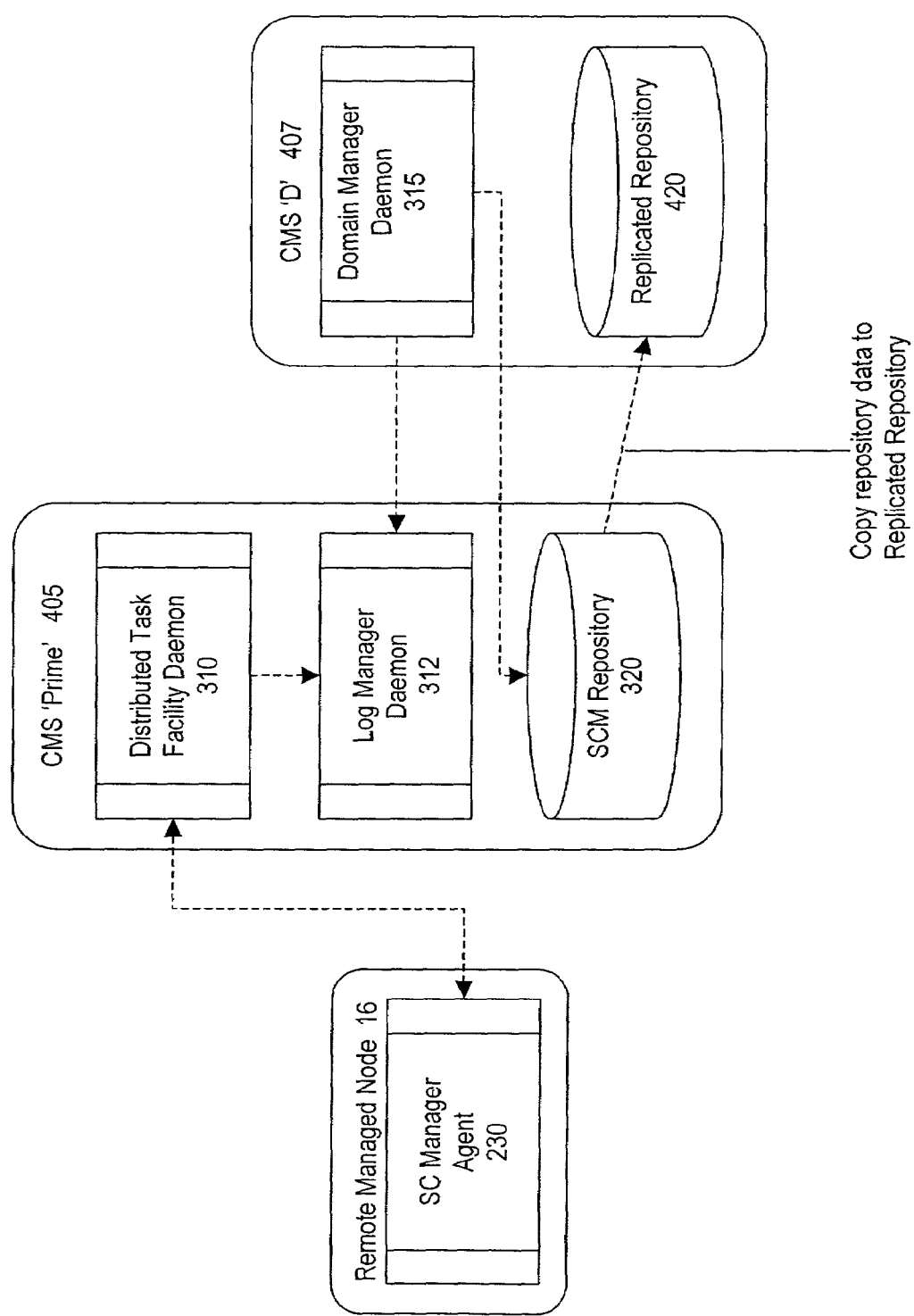
FIG. 4 is a block diagram of one embodiment of the system of multiple daemons of the present invention running on multiple computer systems.

FIG. 4 shows another embodiment of the multiple daemon system of the present invention running on multiple computer systems. In this example, the functions of the SCM 12 are once again divided into a plurality of separate, independently executing daemons. However, in this embodiment, two of the daemons, the Distributed Task Facility daemon 310 and the Log Manager daemon 312 both execute on one computer system, a CMS 'prime' 405, and the third daemon, the Domain Manager daemon 315 runs on a separate computer system, CMS 'D' 407. The SCM Repository 320 resides on the CMS 'prime' 405 and a copy of this repository, a Replicated Repository 420, resides on the separate CMS 'D' 407. While the SCM Repository 320 is operating, it copies the information stored within itself to the Replicated Repository 420 in order to provide a backup of all code and data stored in the SCM Repository 320.

This separation of daemons to differing computer systems provides an additional level of protection against the single point of failure inherent in a single computer system hosting the entire systems management application. For example, should the computer system CMS 'D' 407 stop operating, thus causing a failure of the Domain Manager daemon 315 and making the Replicated Repository 420 unavailable, all of the functions of the SCM 12 would not become unavailable. Since the DTF daemon 310 and the Log Manager daemon 312 are running on the CMS 'prime' 405 they would continue to operate and provide the functions for which they are designed. The SCM Repository 320 would remain available even when the CMS 'D' 407 fails. Likewise, if the CMS 'prime' 405 were to stop operating, although the functions of the DTF daemon 310, the Log Manager daemon 312, and the SCM Repository 320 would become unavailable, the Domain Manager daemon 315 and the Replicated Repository 420 residing on the separate, still operating CMS 'D' 407 would remain available and functional. When the SCM Repository 320 is unavailable, the other daemons then redirect their calls for code and data to the Replicated Repository 420. In this embodiment, as in all others shown herein, the SCM Agent 230 runs as a daemon on a remote managed node 16.

Figure 5:
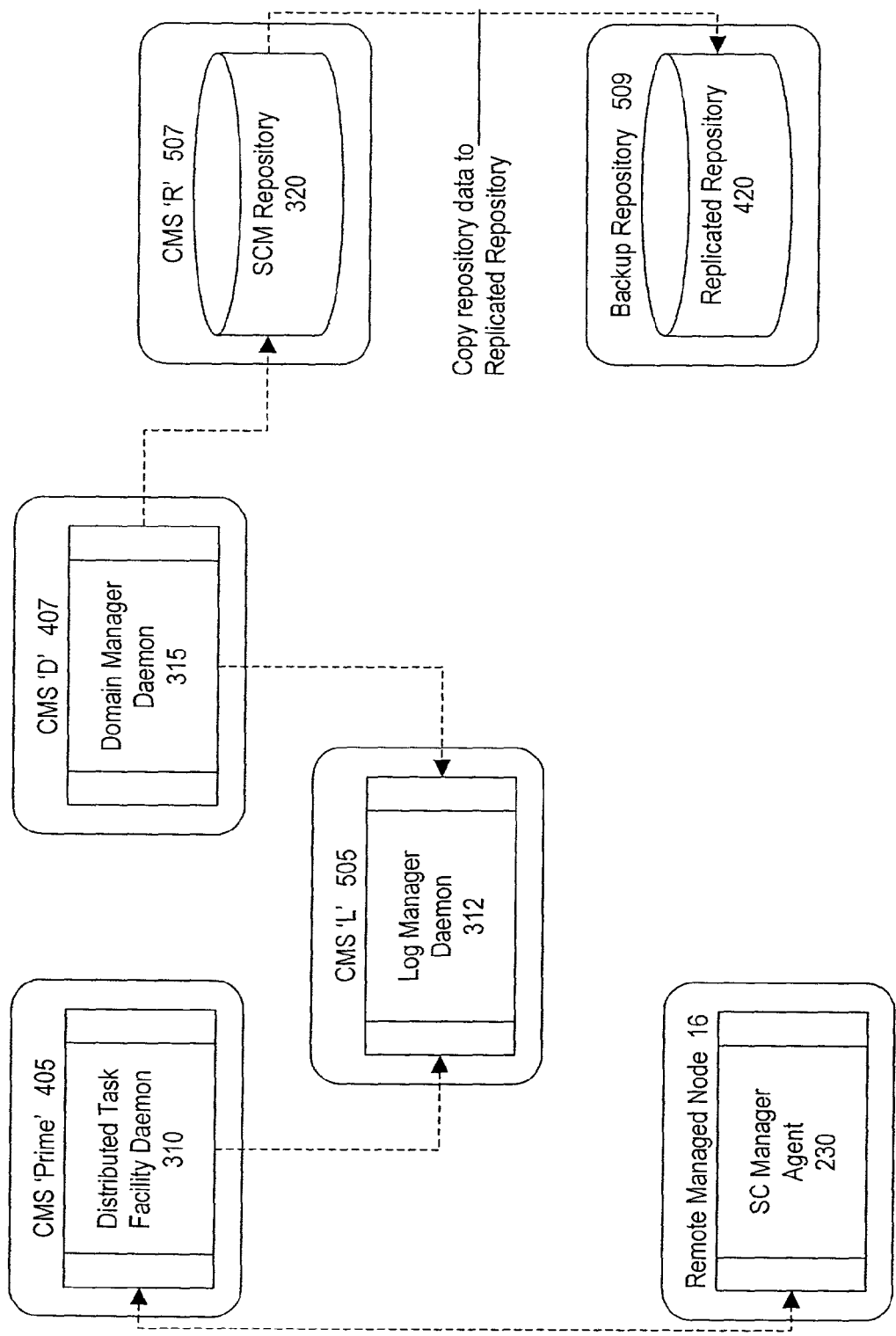
FIG. 5 is a block diagram of another embodiment of the system of multiple daemons of the present invention running on multiple computer systems.

FIG. 5 shows another embodiment of the multiple daemon system of the present invention running on multiple computer systems, wherein each daemon is individually running on a separate computer system. The functions of the SCM 12 are once again divided into a plurality of separate, independently executing daemons. In this case, each component of the SCM application resides on a separate computer system. The DTF daemon 310 is now the sole component running on the CMS 'prime' 405. The Log Manager daemon 312 now runs on a separate computer system, a CMS 'L' 505. The SCM Repository 320 now resides on a separate computer system, a CMS 'R' 507. The Domain Manager daemon 315 is now the sole component running on the CMS 'D' 407. The Replicated Repository 420 now resides on a separate computer system, a Backup Repository 509. In this manner, if any one daemon or repository, or any one computer system hosting any daemon or repository fails, then the functions of the other daemons and repositories are generally unaffected and remain available. The SCM Agent 230 is once again shown running as a daemon on a remote managed node 16.

Figure 6:
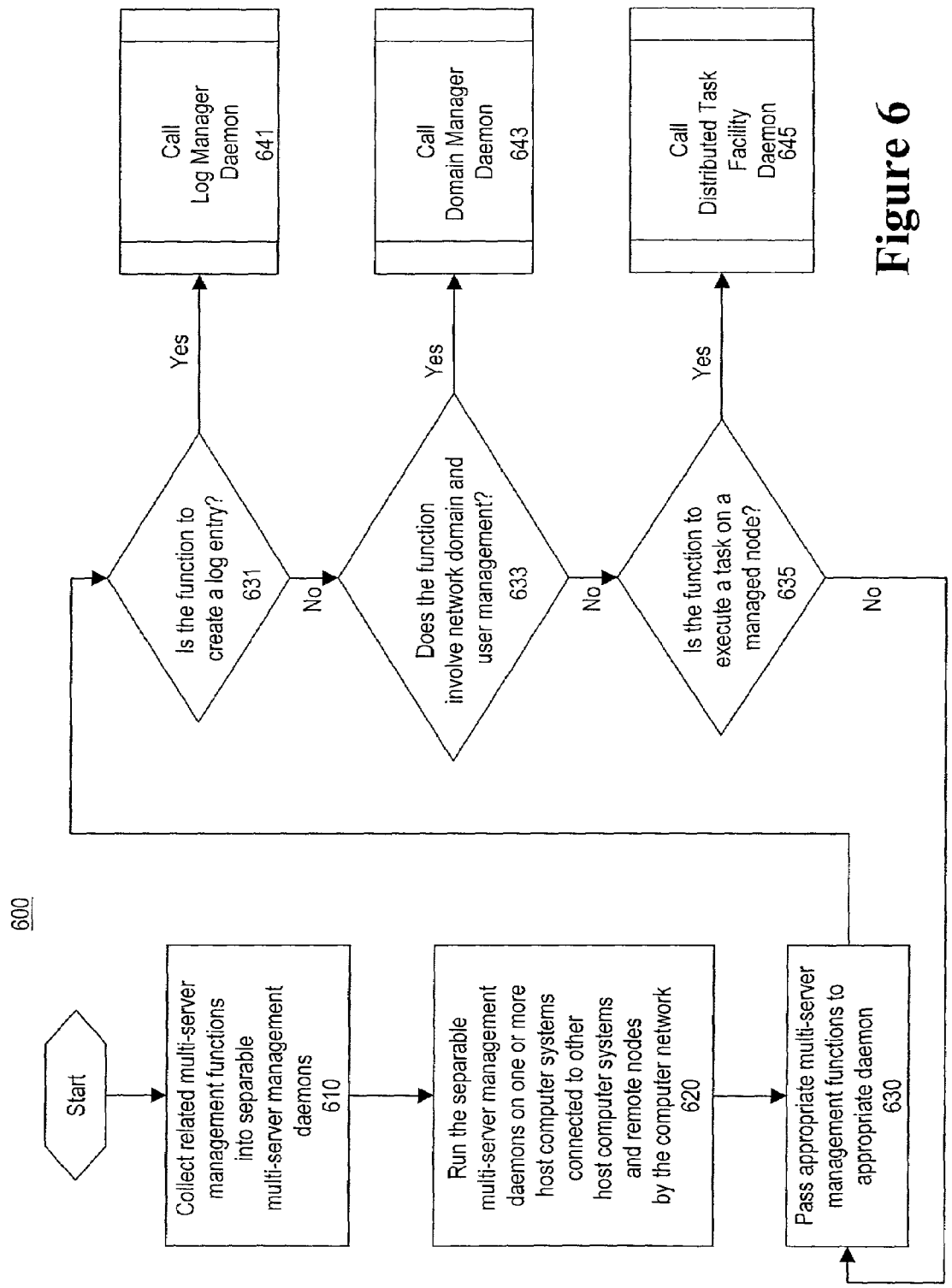
FIG. 6 is a flowchart of one embodiment of a method for separating the functions of a multi-server management system into separable daemons.

FIG. 6 is a flowchart of one embodiment of a method 600 for separating the functions of a multi-server management system into separable daemons performing defined groups of multi-server management functions and for having those separable daemons operate together to provide a complete multi-server management system. The method 600 includes the steps of collecting (step 610) related multi-server management functions into separable multi-server management daemons, and running (step 620) the separable multi-server management daemons on one or more host computer systems connected to other host computer systems and remote nodes by a network. The method 600 also provides steps for passing (step 630) the appropriate multi-server management function requests to the appropriate separable daemon to perform that function request. If the function calls for the creation of a log entry to add to an audit trail (step 631), then the Log Manager daemon 312 is called (step 641) to perform the log entry task. The setup and operation of the Log Manager daemon 312 is further illustrated in FIG. 7. If the function calls for an object to be persisted or an already persisted object to be modified (step 633), then the Domain Manager daemon 315 is called (step 643). The setup and operation of the Domain Manager daemon 315 is further illustrated in FIG. 9. If the function calls for the execution of a task, or tool, on a remote managed node 16 (step 635), then the DTF daemon 310 is called (step 645) to run and monitor the task or tool through the SCM Agent 230 running on the remote managed node 16. The setup and operation of the DTF daemon 310 is further illustrated in FIG. 8. Following step 635, the method 600 returns to step 630 to process the next requested multi-server management function.

Figure 7:
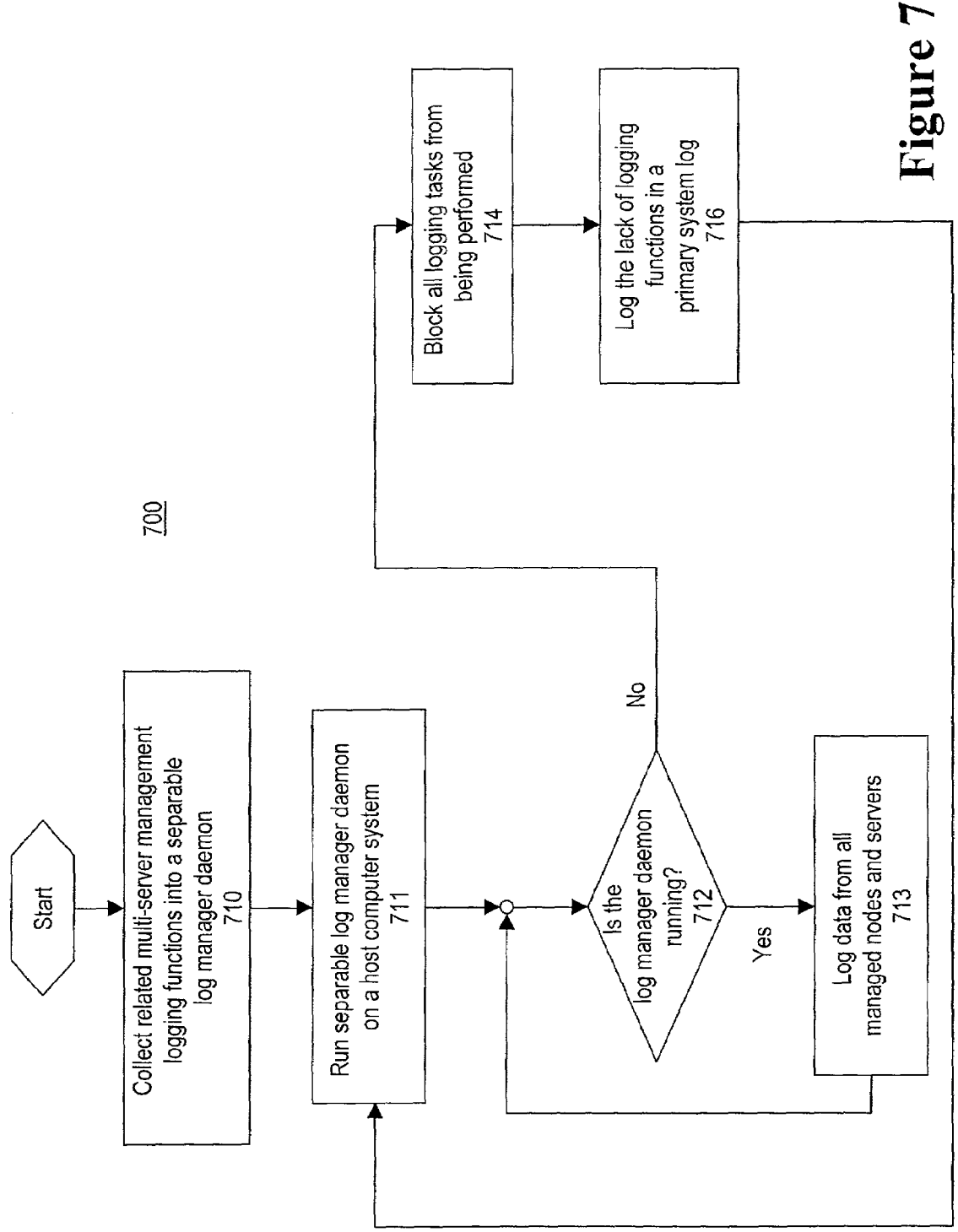
FIG. 7 is a flowchart of one embodiment of a method for setting up and operating a separable Log Manager daemon.

FIG. 7 is a flowchart of one embodiment of a method 700 for configuring and operating a separable Log Manager daemon 312. The method 700 includes the steps of collecting (step 710) related multi-server management event and task reporting logging functions into a separable Log Manager daemon 312, running (step 711) the separable Log Manager daemon 312 on one or more host computer systems connected to other host computer systems and remote nodes by a network, and continually checking (step 712) if the Log Manager daemon 312 is running. If it is found that the Log Manager daemon 312 is not running or has failed to begin executing properly, then the additional steps of blocking (step 714) all logging tasks from being performed, and logging (step 716) the lack of logging functions in a primary system log are performed before returning to restart (step 711) the Log Manager daemon 312. If the Log Manager daemon 312 is running properly, it performs its designated logging functions (step 713), collecting multi-server management log data from all separably operating multi-server management daemons running on each host computer system and remote node connected to the network. Following step 713, the method 700 returns to the checking step 712 to establish a processing loop as long as the Log Manager daemon 312 is running properly.

Figure 8:
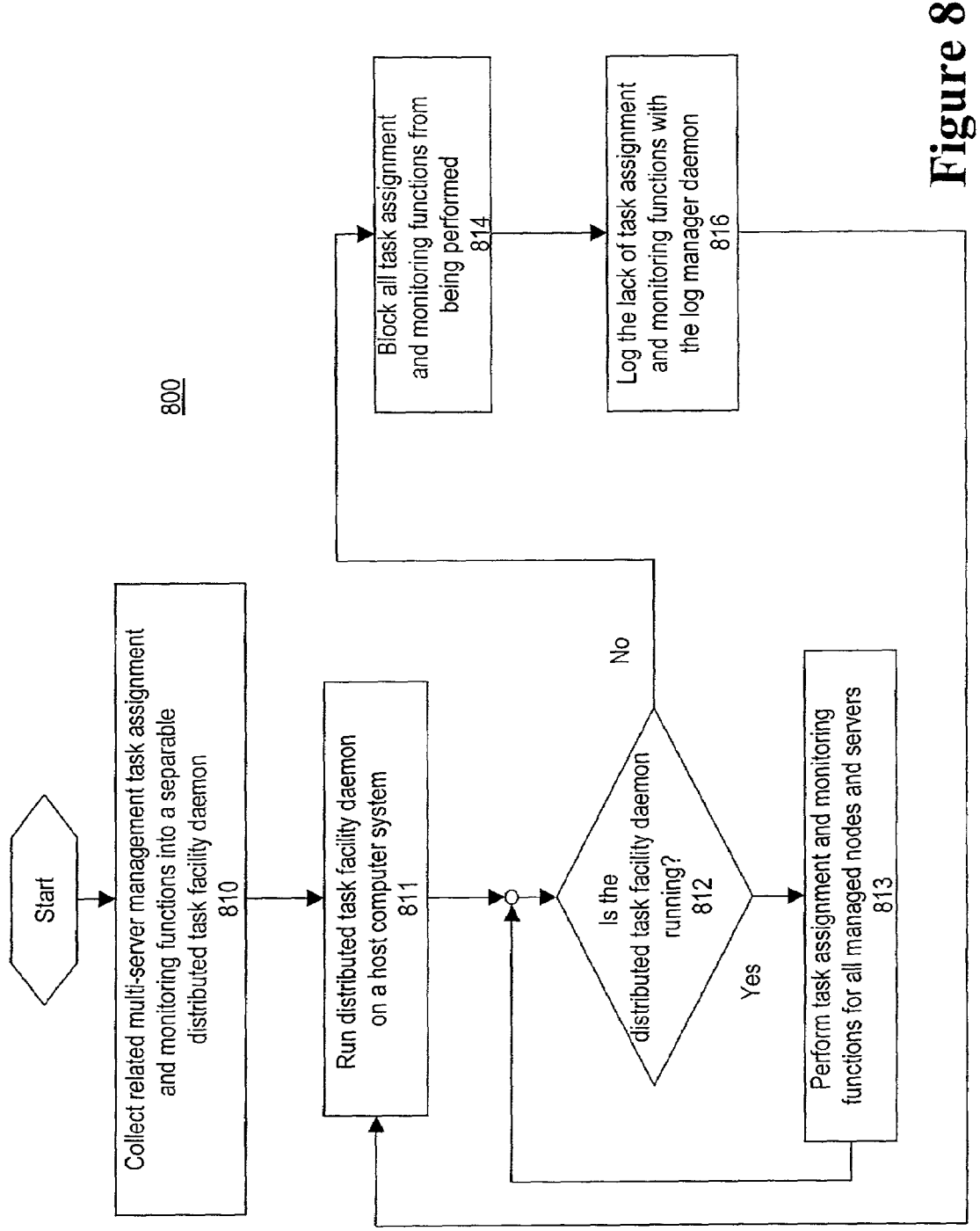
FIG. 8 is a flowchart of one embodiment of a method for setting up and operating a separable Distributed Task Facility daemon.

FIG. 8 is a flowchart of one embodiment of a method 800 for configuring and operating a separable DTF daemon 310. The method 800 includes the steps of collecting (step 810) related multi-server management task assignment and monitoring functions into a separable DTF daemon 310, running (step 811) the separable DTF daemon 310 on one or more host computer systems connected to other host computer systems and remote nodes by a network, and continually checking (step 812) if the DTF daemon 310 is running. If it is found that the DTF daemon 310 is not running or has failed to begin executing properly, then the additional steps of blocking (step 814) all multi-server management task assignment and monitoring functions from being performed, and logging (step 816) the lack of multi-server management task assignment and monitoring functions with the Log Manager daemon 312 are performed before returning to restart (step 811) the DTF daemon 310. If the DTF daemon 310 is running properly, it performs its designated multi-server management task assignment and monitoring functions (step 813), in communication with all separably operating multi-server management daemons running on each host computer system and remote node connected to the network and logging results with the Log Manager daemon 312. Following step 813, the method 800 returns to the checking step 812 to establish a processing loop as long as the DTF daemon 310 is running properly.

Figure 9:
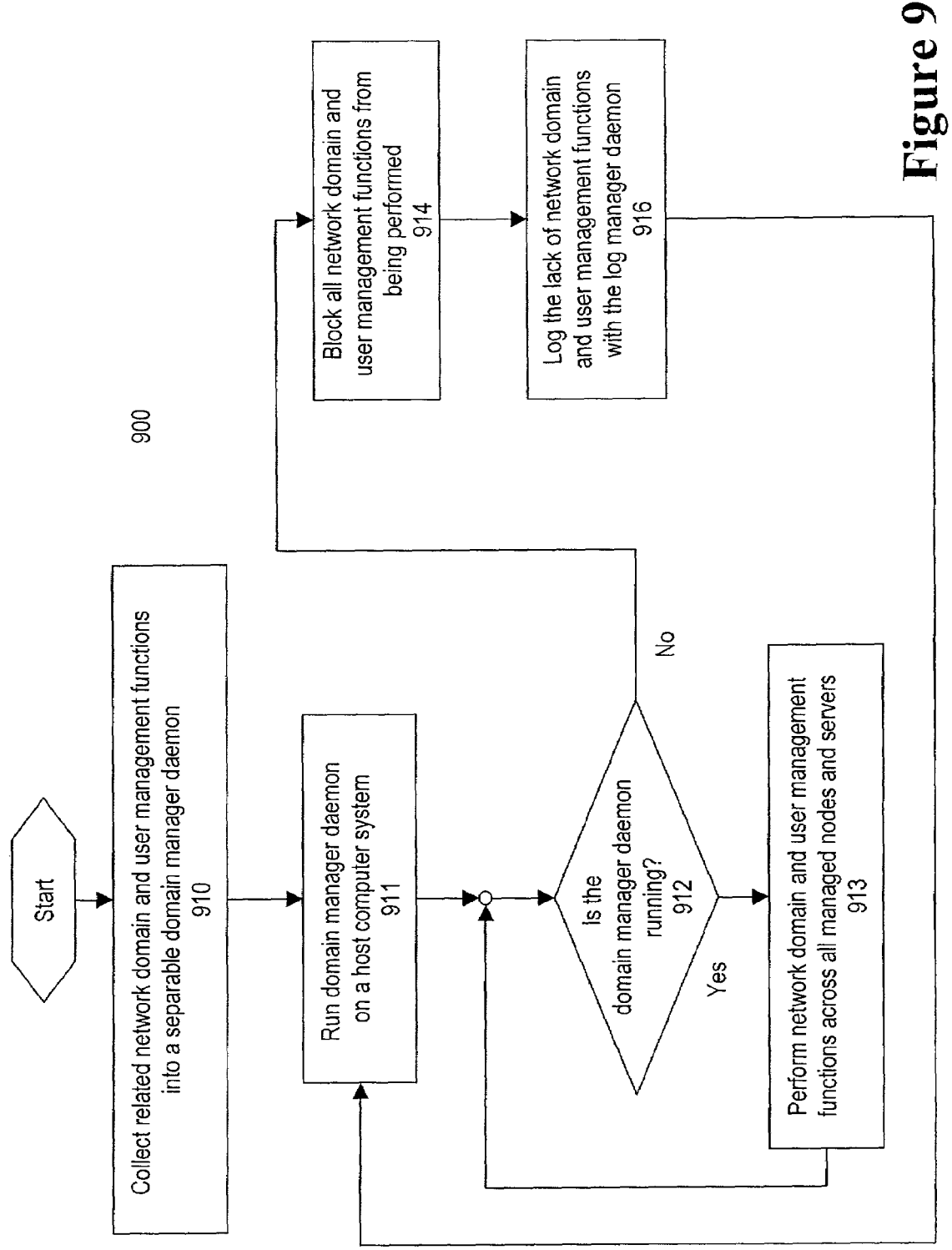
FIG. 9 is a flowchart of one embodiment of a method for setting up and operating a separable Domain Manager daemon.

FIG. 9 is a flowchart of one embodiment of a method 900 for configuring and operating a separable Domain Manager daemon 315. The method 900 includes the steps of collecting (step 910) related network domain and user management functions into a separable Domain Manager daemon 315, running (step 911) the separable Domain Manager daemon 315 on one or more host computer systems connected to other host computer systems and remote nodes by a network, and continually checking (step 912) if the Domain Manager daemon 315 is running. If it is found that the Domain Manager daemon 315 is not running or has failed to begin executing properly, then the additional steps of blocking (step 914) all network domain and user management functions from being performed, and logging (step 916) the lack of network domain and user management functions with the Log Manager daemon 312 are performed before returning to restart (step 911) the Domain Manager daemon 315. If the Domain Manager daemon 315 is running properly, it performs its designated network domain and user management functions (step 913), in communication with the DTF daemon 310 and other relevant separably operating multi-server management daemons running on host computer systems and remote nodes connected to the network and logging the results with the Log Manager daemon 312. Following step 913, the method 900 returns to the checking step 912 to establish a processing loop as long as the Domain Manager daemon 315 is running properly.

Figure 10:
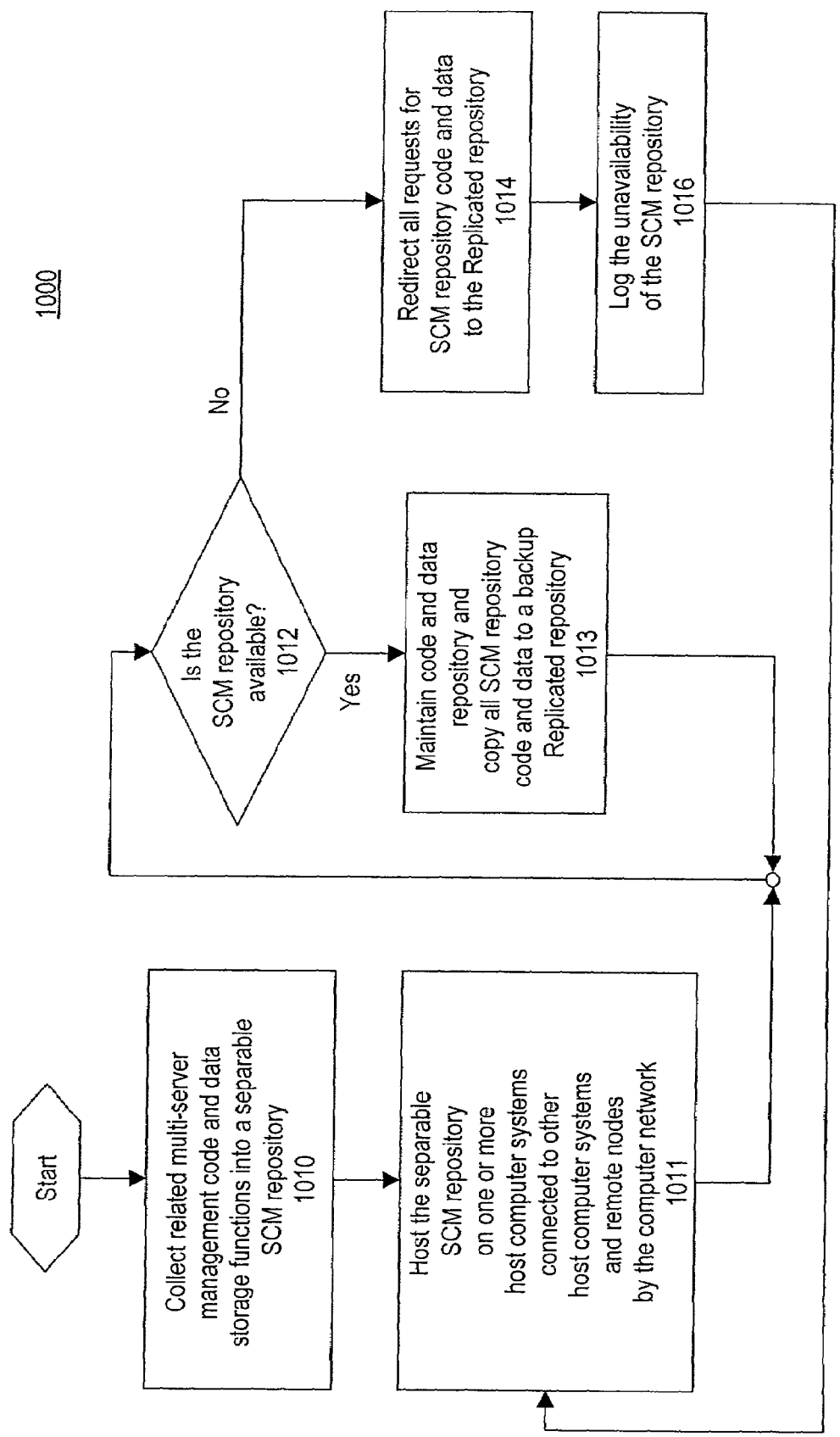
FIG. 10 is a flowchart of one embodiment of a method for setting up and operating a separable multi-server management code and data repository.

FIG. 10 is a flowchart of one embodiment of a method 1000 for setting up and operating a separable SCM Repository 320. The method 1000 includes the steps of collecting (step 1010) related multi-server management code and data storage functions into a separable SCM Repository 320; hosting (step 1011) the separable SCM Repository 320 on a host computer systems connected to other host computer systems and remote nodes by a network; and continually checking (step 1012) if the SCM Repository 320 is available. If the SCM Repository 320 is available, it performs its designated function of storing all multi-server management code and data and maintains a backup (step 1013) of all multi-server management code and data by copying the contents of the SCM Repository 320 to a backup Replicated repository 420. Following step 1013, the method 1000 returns to the checking step 1012 to establish a processing loop as long as the SCM Repository 320 is available. If it is found that the SCM Repository 320 is unavailable, then the additional steps of redirecting (step 1014) all requests for SCM Repository 320 code and data to the Replicated repository 420; and logging the unavailability of the SCM Repository 320 with the Log Manager daemon 312 are performed before returning to restore (step 1011) the SCM Repository 320.

The steps of the methods 600, 700, 800, 900, and 1000 can be implemented with hardware or by execution of programs, modules or scripts. The programs, modules or scripts can be stored or embodied on one or more computer readable mediums in a variety of formats, such as source code, object code or executable code. The computer readable mediums may include, for example, both storage devices and signals. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the described methods can be configured to access, including signals downloaded through the Internet or other networks.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A system for distributing the functions of managing multiple computer systems on a computer network to multiple daemons executing on one or more host computer systems, the system comprising:

a plurality of multi-server management daemons each performing discrete and separable functions of multiple computer system management, wherein the plurality of multi-server management daemons are hosted by one or more host computer systems; and multiple remote nodes managed by the plurality of multi-server management daemons, wherein the multiple remote nodes are separate from the host computer systems and a distributed task facility daemon, from the plurality of multi-server management daemons, providing a communication interface between the plurality of multi-server management daemons, hosted by the one or more host computer systems, and the multiple remote nodes, and one or more of the plurality of multi-server management daemons managing tasks performed on the one or more remote nodes.

2. A system for distributing the functions of managing multiple computer systems on a computer network to multiple daemons executing on one or more host computer systems, the system comprising:

a plurality of multi-server management daemons each performing discrete and separable functions of multiple computer system management, wherein the plurality of multi-server management daemons are hosted by one or more host computer systems; and multiple remote nodes managed by the plurality of multi-server management daemons, wherein each of the plurality of multi-server management daemons is coupled to each of the multiple remote nodes and wherein the plurality of multi-server management daemons comprise:

a distributed task facility daemon that operates on a host computer system remote from the multiple remote nodes;

a domain manager daemon;

a log manager daemon; and a service control manager repository, wherein the distributed task facility daemon providing a communication interface between the plurality of multi-server management daemons, hosted by the one or more host computer systems, and the multiple remote nodes, and one or more of the plurality of multi-server management daemons managing tasks performed on the one or more remote nodes.

3. The system of claim 1, further comprising a service control manager agent executing on each of the remote nodes, wherein the service control manager agent performs server management tasks and communicates with one or more of the plurality of multi-server management daemons.

4. The system of claim 3, wherein the service control manager agent is a daemon running on each of the remote nodes.

5. The system of claim 1, wherein one host computer system hosts all of the plurality of multi-server management daemons.

6. The system of claim 1, wherein each of the plurality of multi-server management daemons is hosted by a different host computer system.

7. A method for managing multiple computer systems connected in a computer network using multiple daemons, the method comprising the steps of:

separating all multi-server management functions into groups of related functions;

creating the multiple daemons to perform each of the groups of separated multi-server management functions;

distributing the multiple daemons to one or more host computer systems; and the distributed multiple daemons managing multiple remote nodes, wherein the multiple remote nodes are separate from the host computer systems and a distributed task facility daemon, from the distributed multiple daemons, providing a communication interface between the distributed multiple daemons and the multiple remote nodes, and one or more of the plurality of multi-server management daemons managing tasks performed on the one or more remote nodes.

8. The method of claim 7, further comprising:

executing the multiple daemons on the one or more host computer systems;

providing a communications interface enabling the multiple daemons to interact with each other across the computer network; and coordinating the multi-server management functions of the multiple daemons.

9. The method of claim 8, wherein the creating step includes:

creating a log manager daemon for performing multi-server management event and task reporting logging functions;

creating a domain manager daemon for performing network domain and user management functions; and creating a distributed task facility daemon for performing multi-server management task assignment and monitoring functions.

10. The method of claim 9, wherein the coordinating step further comprises the steps of:

determining the multi-server management function; and passing the multi-server management function on to the appropriate daemon.

11. The method of claim 10, wherein the passing step comprises:

passing the multi-server management function to the log manager daemon when creating a log entry;

passing the multi-server management function to the domain manager daemon when the function involves network domain and user management; and passing the multi-server management function to the distributed task facility daemon when the function involves executing and monitoring a task on a managed computer system.

12. The method of claim 11, wherein the executing step comprises running a created daemon on a host computer system connected to other host computer systems and remote managed nodes by the computer network; and performing the multi-server management functions created in connection with other host computer systems and remote managed nodes.

13. The method of claim 12, further comprising performing the following steps when the created daemon has stopped running:

blocking performance of the daemon's functions;

logging the lack of the daemon's functionality; and returning to the running step to restart the daemon.

14. The method of claim 13, wherein the separating step further comprises collecting related multi-server management event and task reporting logging functions into a single and separable log manager daemon.

15. The method of claim 13, wherein the separating step further comprises collecting related multi-server management task assignment and monitoring functions into a single and separable distributed task facility daemon.

16. The method of claim 13, wherein the separating step further comprises collecting related network domain and user management functions into a single and separable domain manager daemon.

17. A computer readable storage medium on which is embedded a program, the program comprising modules that execute a method for managing multiple computer systems connected in a computer network using multiple daemons, the method comprising the steps of:

separating all multi-server management functions into groups of related functions;

creating the multiple daemons to perform each of the groups of separated multi-server management functions;

distributing the multiple daemons to one or more host computer systems; and the distributed multiple daemons managing multiple remote nodes, wherein the multiple remote nodes are separate from the host computer systems and a distributed task facility daemon, from the distributed multiple daemons, providing a communication interface between the distributed multiple daemons and the multiple remote nodes, and one or more of the plurality of multi-server management daemons managing tasks performed on the one or more remote nodes.

18. The computer readable storage medium of claim 17, further comprising:

executing the multiple daemons on the one or more host computer systems;

providing a communications interface enabling the multiple daemons to interact with each other across the computer network; and coordinating the multi-server management functions of the multiple daemons.

19. The computer readable storage medium of claim 18, wherein the creating step includes:

creating a log manager daemon for performing multi-server management event and task reporting logging functions;

creating a domain manager daemon for performing network domain and user management functions; and creating a distributed task facility daemon for performing multi-server management task assignment and monitoring functions.

20. The computer readable storage medium of claim 19, wherein the coordinating step further comprises the steps of:

determining the multi-server management function; and passing the multi-server management function on to the appropriate daemon.

21. A system for distributing the functions of managing multiple computer systems on a computer network to multiple daemons executing on one or more host computer systems, the system comprising:

a plurality of multi-server management daemons each performing discrete and separable functions of multiple computer system management, wherein the plurality of multi-server management daemons are hosted by one or more host computer systems and the multiple computer system management functions operate above operating system level; and multiple remote nodes managed by the plurality of multi-server management daemons, wherein a distributed task facility daemon, from the plurality of multi-server management daemons, providing a communication interface between the plurality of multi-server management daemons, hosted by the one or more host computer systems, and the multiple remote nodes, and one or more of the plurality of multi-server management daemons managing tasks performed on the one or more remote nodes.

* * * * *

UNITED STATES PATENT AND TRADEMARK OFFICE
CERTIFICATE OF CORRECTION

| | | |
|---|---|---|
| PATENT NO. | : 7,188,343 B2 | |
| APPLICATION NO. | : 09/859374 | |
| DATED | : March 6, 2007 | |
| INVENTOR(S) | : Humberto A. Sanchez, II et al. | |

It is certified that error appears in the above-identified patent and that said Letters Patent is hereby corrected as shown below:

<u>Title page, item (75) Inventors:</u>

Replace, "Carol Ann Krug-Graves, Monte Sereno, CA (US)" with --Carol Ann Krug Graves, Monte Sereno, CA (US)--

Signed and Sealed this

Eighth Day of May, 2007

JON W. DUDAS
*Director of the United States Patent and Trademark Office*